| United States Patent [19] | [11] Patent Number: 4,769,393 |
|---|---|
| Kuwabara et al. | [45] Date of Patent: Sep. 6, 1988 |

[54] EXPANDED PARTICLES OF MODIFIED POLYETHYLENE AND FOAMED ARTICLES OBTAINED THEREFROM

[75] Inventors: Hideki Kuwabara, Hadano; Masato Naito, Hiratsuka, both of Japan

[73] Assignee: Japan Styrene Corporation of Japan, Tokyo, Japan

[21] Appl. No.: 926,521

[22] Filed: Nov. 4, 1986

[30] Foreign Application Priority Data

Nov. 5, 1985 [JP] Japan ................................. 60-248254
Nov. 5, 1985 [JP] Japan ................................. 60-248255

[51] Int. Cl.⁴ ............................................... C08J 9/18
[52] U.S. Cl. ...................................... 521/59; 521/60; 521/134
[58] Field of Search ............................ 521/59, 134, 60

[56] References Cited

U.S. PATENT DOCUMENTS

| 3,743,611 | 7/1973 | Muroi et al. | 521/60 |
| 4,168,353 | 9/1979 | Kitamori | 521/59 |
| 4,303,756 | 12/1981 | Kajimura et al. | 521/59 |
| 4,368,218 | 1/1983 | Senda et al. | 521/59 |
| 4,525,486 | 6/1985 | Kobayashi et al. | 521/59 |

*Primary Examiner*—Morton Foelak
*Attorney, Agent, or Firm*—Stephen F. K. Yee

[57] ABSTRACT

Expanded particles obtained by a method including the steps of: providing unexpanded particles formed of a polyethylene resin; impregnating the unexpanded particles with a liquid containing a polymerizable monomer including an acrylic monomer, and optionally a styrenic monomer; subjecting the impregnated polymerizable monomer to polymerization conditions so that at least a portion of the polymerizable monomer is grafted on the polyethylene resin to obtain modified polyethylene particles; and subjecting the modified polyethylene particles to an expansion treatment. Further expansion of the expanded particles within a mold gives a foamed article suitable for use as a consumable pattern in full mold casting.

19 Claims, No Drawings

EXPANDED PARTICLES OF MODIFIED POLYETHYLENE AND FOAMED ARTICLES OBTAINED THEREFROM

This invention relates to expanded particles formed of a modified polyethylene resin, and to foamed articles which are obtained from such expanded particles and which are particularly useful as consumable patterns used in full mold casting, cores for the preparation of unsaturated polyester resin molded articles, etc.

There is known a full mold casting method including the steps of providing a consumable pattern which in shape is an exact replica of the intended casting and which is formed of an expanded plastic material, surrounding the pattern with particulate refractory material, vaporizing the pattern by contacting the pattern with molten metal, and filling the resulting cavity with the molten metal. Polystyrene resins have conventionally been used for the formation of consumable patterns. Because of the presence of benzene rings, however, the polystyrene resins are incapable of being perfectly decomposed and volatilized upon contact with a molten metal charge and have a tendency to leave a residue upon volatilization, causing surface defects such as dirt, carbon deposits, wrinkles and roughness; and inside defects such as carburization, in the resulting castings.

The use of polyolefin resins, which have no aromatic moieties and are free of generation of soot during vaporization, have recently been proposed for the preparation of consumable patterns. However, patterns formed of polyolefin resins have relatively low rigidity as compared with those formed of styrene resins. In an attempt to improve the rigidity, a method has been proposed in which polyolefin resins are modified by grafting thereon a styrenic monomer. However, in order to provide a consumable pattern with satisfactory rigidity, it is necessary to use the monomer in an amount of at least 30 parts by weight per 100 parts by weight of the polyethylene resin. Such an amount of the styrene monomer adversely affects the desirable properties of the polyethylene resin and causes the reduction of impact resistance and the increase of the generation of soot upon vaporization.

The present invention contemplates the provision of shaped, foamed bodies which have improved rigidity and compressive hardness, which retain excellent properties inherent to polyethylene resins, such as lowness in compression set and excellence in combustibility and impact resistance, and which are suitable for use as consumable patterns for full mold casting.

In accordance with the present invention there is provided expanded particles obtained by a method including the steps of: providing unexpanded particles formed of a polyethylene resin; impregnating said unexpanded particles with a liquid containing a polymerizable monomer, including an acrylic monomer, of the formula:

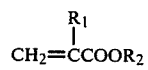

wherein $R_1$ represents hydrogen or methyl and $R_2$ represents hydrogen or an alkyl; subjecting the impregnated polymerizable monomer to polymerization conditions so that at least a portion of said acrylic monomer is grafted on the polyethylene resin to obtain modified polyethylene particles; and subjecting the modified polyethylene particles to an expansion treatment to obtain said expanded particles.

In another aspect, the present invention provides expanded particles formed of a polyethylene resin having grafted thereon a polymerizable monomer including an acrylic monomer, of the formula:

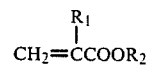

wherein $R_1$ represents hydrogen or methyl and $R_2$ represents hydrogen or an alkyl, the amount of the polymerizable monomer grafted on the polyethylene resin being in the range of 8–50% based on the total weight of the polyethylene resin and the grafted polymerizable monomer.

The present invention also provides a shaped, foamed article obtained by a method including the steps of filling a mold cavity with the above described expanded particles and heating the expanded particles for further expansion thereof within the mold.

The present invention will now be described in more detail below.

The polymerizable monomer for modifying the polyethylene resin should contain an acrylic monomer of the formula shown above. Examples of suitable acrylic monomer include acrylic acid, methyl acrylate, ethyl acrylate, propyl acrylate, n-butyl acrylate, isobutyl acrylate, t-butyl acrylate, methacrylic acid, methyl methacrylate, ethyl methacrylate, propyl methacrylate, n-butyl methacrylate, t-butyl methacrylate and isobutyl methacrylate.

In one preferred embodiment, the polymerizable monomer consists essentially of the acrylic monomer. The acrylic monomer may be used in conjunction with a small amount (generally 10 weight % or less) of a copolymerizable monomer such as a styrene monomer, if desired. In another preferred embodiment, the polymerizable monomer consists essentially of a mixture of the acrylic monomer and a styrenic monomer having the general formula:

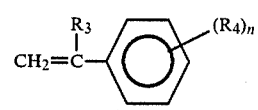

wherein $R_3$ represents hydrogen, a halogen or an alkyl, $R_4$ represents hydrogen, a halogen or an alkyl and n is an integer of 1–5. Illustrative of suitable styrenic monomers are styrene, alpha-methylstyrene, alpha-ethylstyrene and p-methylstyrene.

The unexpanded particles used as a starting material are preferably made of a high density polyethylene resin having a density of 0.950–0.970 g/cm³. A density of the polyethylene resin below 0.950 g/cm³ tends to lower the rigidity of a shaped, foamed body prepared from such a resin. The polyethylene resin preferably has an MFR (melt flow rate) value of not greater than 8, more preferably not greater than 5, for reasons of crosslinkability of the resin and rigidity of the final foamed body. The unexpanded particles preferably have a particle size of 0.3–2 mm. A particle size of less than 0.3 mm tends to cause difficulties in the expansion operation while a particle size of greater than 2 mm tends to cause undesirable adhesion between the particles during the graft polymerization step.

Before modifying or reforming the unexpanded polyethylene particles, it is preferred that the polyethylene particles be subjected to a crosslinking treatment to a degree so that the resulting crosslinked polyethylene resin particles have a gel fraction of 10-40%. More preferably, the crosslinking degree is such as to provide a gel fraction of 20-35% when the polymerizable monomer used in the succeeding step is an acrylic monomer, and 15-30% when the polymerizable monomer used is a mixture of acrylic and styrenic monomers. When the gel fraction of the crosslinked polyethylene resin is higher than 40%, the resulting expanded particles tend to have a poor expansion property so that it becomes difficult to obtain a shaped, foamed body with a voidsfree smooth surface from such expanded particles. A gel fraction below 10% tends to give a shaped, foamed body with a continuous cellular structure rather than a preferable closed cellular structure.

The term "gel fraction" used in the present specification is intended to mean a xylene insoluble content of the crosslinked polyethylene particles and is defined by the following equation:

$$P(\%) = (M/L) \times 100$$

wherein P stands for gel fraction, M stands for the weight of insoluble residues remaining after immersing the crosslinked polyethylene resin particles in boiled xylene for 8 hours, and L stands for the weight of the resin particles prior to the xylene treatment.

The crosslinking may be performed in any known manner. An example of suitable method for crosslinking polyethylene resin particles includes mixing, in an autoclave, the polyethylene resin particles, a crosslinking agent, an adhesion-preventing agent and water, heating the mixture with stirring to a temperature higher than the softening point of the resin to impregnate the resin particles with the crosslinking agent, and heating the resulting mixture to a temperature sufficient to effect the crosslinking. The crosslinking agent may be, for example, an organic peroxide such as dicumyl peroxide, 1,1-bis(t-butylperoxy)-3,3,5-trimethylcyclohexane, n-butyl-4,4-bis(t-butylperoxy)-valerate, t-butylcumyl peroxide or 2,5-dimethyl-2,5-di(t-butylperoxy)hexane. The crosslinking agent is used in an amount of 0.05-5 parts by weight per 100 parts by weight of the polyethylene resin. It is preferable to use the crosslinking agent together with divinylbenzene. Divinylbenzene is generally used in an amount of 0.05-5 parts by weight per 100 parts by weight of the polyethylene resin. The adhesion-preventing agent may be, for example, aluminum oxide, titanium oxide, aluminum hydroxide, basic magnesium carbonate, basic zinc carbonate, calcium phosphate or zinc carbonate.

The crosslinked polyethylene resin particles are then dispersed in an aqueous medium together with the above described polymerizable monomer and a radical polymerization initiator to impregnate the resin particles with the monomer and initiator. The dispersion containing the impregnated resin particles are heated to effect the polymerization of the monomer to obtain reformed, unexpanded polyethylene resin particles.

The amount of the polymerizable monomer used for reaction with the polyethylene resin is generally 10-50% based on the total weight of the monomer and the polyethylene resin. When the monomer used is an acrylic monomer only, the amount of the monomer used is preferably 20-40%. When the polymerizable monomer used is a mixture of acrylic and styrenic monomers, the amount of the polymerizable monomer used is preferably 10-30%. An amount of the polymerizable monomer below 10 wt % tends to result in insufficient improvement in rigidity of a shaped, foamed body prepared from the expanded particles. On the other hand, too high an amount of the grafted monomer, over 50 wt %, can adversely affect the desirable properties of the polyethylene resin. The content of the styrenic monomer is preferably 90-10%, more preferably 70-20% based on the weight of the polymerizable monomer (i.e. total weight of the styrenic monomer and the acrylic monomer). It is preferred that the amount of the styrenic monomer be not greater than 20% based on the total weight of the polyethylene resin and the polymerizable monomer.

The polymerization initiator may be any known initiator and may include, for example, 1,1-bis(t-butylperoxy)-3,3,5-trimethylcyclohexane, di-t-butyl peroxide, dicumyl peroxide, t-butyl peroxybenzoate or benzoil peroxide. The polymerization initiator is generally 0.01-3 parts by weight, preferably 0.1-2.0 parts by weight per 100 parts by weight of the polymerizable monomer. Too small an amount of the initiator is insufficient to effect the graft polymerization while an excess amount of the initiator results in the formation of undesirable low molecular weight grafted components.

The impregnation of the resin particles with the monomer and the initiator is preferably performed at a temperature of 70°-110° C. At a temperature below 70° C., the impregation with the polymerizable monomer tends to become difficult to perform while a temperature over 110° C. can cause polymerization of the monomer on the surface of the particles prior to the impregnation. The polymerization is generally performed at a temperature of 85°-150° C.

The polymerization is preferably conducted so that the graft efficiency of the monomer in the modified polyethylene resin particles is generally at least 80%, preferably at least 85%. When the graft efficiency is below 80%, the compression hardness cannot be improved to a satisfactory degree and dimensional stability is lowered. The term "graft efficiency" used herein is defined by the following equation:

Graft Efficiency $(\%) = [(W_1' - W_0)/(W_1 - W_0)] \times 100$ wherein $W_1$ represents the weight of the reformed polyethylene resin particles obtained by the above graft polymerization treatment, $W_0$ represents the weight of the polyethylene resin particles prior to the polymerization treatment and $W_1'$ represents the weight of the residues obtained by immersing the modified polyethylene resin particles in a boiling mixed solvent composed of acetone and benzene (1:1 wt/wt) for 8 hours.

The crosslinking of the polyethylene resin particles is preferably conducted before the modification of the resin particles with a polymerizable monomer. Since the temperature at which the high density polyethylene resin is crosslinked is close to the temperature at which the polymerization initiator is decomposed, i.e. at which the polymerizable monomer is polymerized, the gel fraction of modified polyethylene resin particles can not be controlled if the crosslinking and the polymerization treatments are conducted simultaneously.

The unexpanded, reformed polyethylene resin particles thus obtained are then subjected to an expansion treatment to obtain expanded particles of this invention. The expansion treatment may be performed, for example, by dispersing the unexpanded particles in an aqueous medium containing a volatile blowing agent and a dispersing agent (adhesion-preventing agent) within a closed vessel, heating the dispersion to impregnate the unexpanded particles with the blowing agent, heating the dispersion under a pressure and at a temperature higher by 0°-30° C. than the softening point of the unexpanded particles, and releasing the dispersion from one end of the vessel to an atomsphere lower in pressure than that within the vessel while maintaining the pressure within the vessel constant.

Examples of the blowing agents include hydrocarbons such as propane, butane and pentane and halogenated hydrocarbons such as trichlorofluoromethane, dichlorofluoromethane, dichlorotetrafluoroethane, methyl chloride, ethyl chloride and mthylene chloride. The blowing agent is used in an amount of 0.05-0.5 mole, preferably 0.1-0.4 mole, per 100 parts by weight of the reformed, unexpanded particles. When the amount of the blowing agent is below 0.05 mole, the resulting expanded particles have too low an expansion ratio. An amount of the blowing agent over 0.5 mole causes the formation of undesirable continuous cells. Examples of the dispersing agents include aluminum oxide, titanium oxide, aluminum hydroxide, basic magnesium carbonate, basic zinc carbonate, calcium phosphate and zinc carbonate. The dispersing agent is used in an amount of 0.05-10 parts by weight, preferably 0.1-5 parts by weight, per 100 parts by weight of the modified, unexpanded particles.

The impregnation of the unexpanded particles with the blowing agent is preferably carried out at a temperature higher than the melting point of the particles and is conducted such that the unexpanded particles contain 0.03-0.45 mole, preferably 0.05-0.35 mole of the blowing agent per 100 parts by weight of the unexpanded particles. The dispersion containing the blowing agent-impregnated particles, is then heated at a temperature higher than the melting point of the particles, but not higher by 30° C. than the melting point of the particles and is released from one end of the vessel to a low pressure zone while maintaining the inside of the vessel at a predetermined pressure, generally 10-100 kg/cm$^2$G, preferably 20-50 kg/cm$^2$G, thereby to obtain expanded particles. At an expansion temperature below the melting point, the resulting expanded particles have too low an expansion ratio, too small a cell size and non-uniform cell sizes. On the other hand, an expansion temperature of higher by 30° C. or more is disadvantageous because the cells of the resulting expanded particles have a low strength. The expansion is generally conducted to provide an apparent expansion ratio of 5-100.

For the purpose of the present specification, "melting point" is measured by differential scanning calorimetric analysis. Namely, sample particles (about 5 mg) are heated at a rate of 10° C./min, while measuring the temperature and the differential calorific value, to 220° C. and then cooled at a rate of 10° C./min to 50° C. The sample is again heated at a rate of 10° C./min to obtain a melting curve. The melting point is a temperature at which a heat absorbing peak exists.

The expanded particles according to the present invention, when used as raw materials for the preparation of consumable patterns for full mold casting, preferably have an apparent density of 0.03-0.011 g/cm$^3$, more preferably 0.022-0.015 g/cm$^3$. When used as raw material for the preparation of cores for unsaturated polyester resin molded articles, the expanded particles preferably have an apparent density of 0.1-0.025 g/cm$^3$, more preferably 0.08-0.03 g/cm$^3$. The particle size of the expanded particles is generally 0.5-15 mm.

The preparation of such shaped, foamed bodies from the expanded particles may be effected in any known method. For example, the expanded particles are first placed in the atmosphere of pressurized air so that air is penetrated into the cells of the expanded particles and each cell has an increased inside pressure of, generally 0.2-2.5 Kg/cm$^2$G, preferably about 1 kg/cm$^2$G. The resulting expanded particles are then filled in a mold cavity and heated therewithin with steam of 2-5 kg/cm$^2$G, thereby to further expand the particles. The expanded particles are melt-adhered with each other during the expansion within the mold cavity to give a shaped, foamed body.

The shaped, foamed body obtained from the expanded particles according to the present invention has improved surface hardness, rigidity, resistance to heat and adhesiveness, and retains the desirable properties of the polyethylene resin such as excellent combustibility, inpact resistance and freeness of compression set, and is thus very suited as a consumable pattern in full mold casting, a core material for molding an unsaturated polyester article, and the like.

When the shaped, foamed body is intended to be used as a core for the preparation of a molded article of an unsaturated polyester resin, it is preferred that the foamed body have a density of 0.1-0.025 g/cm$^3$, more preferably 0.08-0.03 g/cm$^3$, and that the amount of the acrylic monomer grafted on the polyethylene resin be 10-25% based on the weight of the polyethylene resin and the grafted monomer, since such a shaped, foamed body can have excellent adhesive properties, rigidity and resistance to organic solvents. The molding method using the core of the foamed body may be, for example, so-called resin injection method in which a liquid charge containing an unsaturated polyester resin is charged into a mold cavity in which the core is disposed in position so that the space between the mold and the core is filled with the liquid charge. Then the liquid is cured and hardened, and the hardened body is released from the mold to obtain a molded article. It is possible to dispose a suitable reinforcing material such as glass fibers or carbon fibers in the space between the core and the mold. The liquid charge is generally a solution obtained by dissolving the unsaturated polyester resin in a vinyl monomer used for crosslinking. The liquid charge may contain a curing catalyst. The curing reaction of the unsaturated polyester is exothermic and, hence, it is not necessary to heat the mold. However, the curing may be forcibly caused to proceed by heating the mold at a temperature of 50°-100° C. for 0.5-1 hour. The molding may be also effected by a hand lay-up method or spray-up method, in which a plate-like foamed core is provided with an unsaturated polyester resin layer or layers on one or both sides thereof, followed by curing of the layer or layers.

When the shaped, foamed body is used as a consumable pattern for full mold casting, it is preferred that the foamed body have a density of 0.03-0.011 g/cm$^3$, more preferably 0.022-0.015 g/cm$^3$. Full mold casting may be conducted by a method including the steps of processing the shaped, foamed body to form a consumable pattern having the same shape as that of the desired casting, embedding the pattern in a mold body, forming in the mold body a gate passage leading to the embedded pattern, and pouring in the gating passage molten metal charge for volatilizing and replacing the embedded pattern in the mold body. The molten metal is then cooled and solidified, and the solidified mass is released from the mold to obtain a casting having the same shape and size as those of the consumed pattern.

The following examples will further illustrate the present invention. In the examples, "parts" are by weight.

EXAMPLE 1

In a closed vessel were charged 100 parts of high density polyethylene pellets having a density of 0.963 g/cm$^3$ and a melt index (MI) of 0.25 and each having a weight of about 3 mg, 300 parts of water, 0.5 part of tricalcium phosphate and 0.28 part of dicumyl peroxide, and the mixture was stirred at 100° C. for 1 hour, and then at 150° C. for 2 hours to obtain crosslinked polyethylene pellets having a gel fraction of 25%. The crosslinked pellets (85 parts) were then placed in a closed vessel, to which 15 parts of methylmethacrylate, 300 parts of water, 0.06 part of sodium dodecylbenzenesulfonate and 1 part of tricalcium phospate were added, and the mixture was stirred at 110° C. for 2 hours. After cooling to 60° C., 0.85 part of 1,1-bis(t-butyl-peroxy)-3,3,5-trimethylcyclohexane per 100 parts of the methylmethacrylate monomer was added to the mixture. The resulting mixture was then reacted at 105° C. for 3 hours, with stirring, to obtain modified polyethylene pellets whose graft efficiency is shown in Table 1.

Into a closed vessel 100 parts of the modified polyethylene pellets, 300 parts of water, 0.3 part of finely divided aluminum oxide and a suitable amount of dichlorodifluoromethane, and the mixture was stirred at 143° C. for 30 minutes. Then the inside of the vessel was pressurized with nitrogen to 35 kg/cm$^2$G and the mixture within the vessel was released to the atmosphere to expand the pellets. The thus-obtained expanded particles were pressurized with air so that each cell of the expanded particles has a pressure of about 1 kg/cm$^2$G. The resultant particles were filled in a mold and heated with 3.5 kg/cm$^2$G of steam to further expand the expanded particles. The shaped, formed product was aged at 60° C. for 24 hours and then allowed to stand at room temperature. The density of the shaped, foamed body thus obtained was as shown in Table 1.

EXAMPLES 2-4

Example 1 was repeated in the same manner as described, except that the amounts of polyethylene pellets and methylmethacrylate were varied as shown in Table 1.

COMPARATIVE EXAMPLES 1-3

Example 1 was repeated in the same manner as described, except that the amounts of polyethylene pellets and methylmethacrylate were varied as shown in Table 1.

COMPARATIVE EXAMPLE 4

Example 4 was repeated in the same manner as described, except that a styrene monomer was used in place of methyl-methacrylate.

Each of the shaped, foamed products obtained in the foregoing examples and comparative examples was tested for compression hardness, combustibility and dimensional stability, in the following manner.

(1) Compression hardness test

The test was carried out in accordance with the method specified in JIS (Japan Industrial Standards) K 6767. The hardness as measured are shown in Table 1. The measured values were compared with those of controls (shaped, formed bodies which were formed of the same polyethylene as used in the above examples and which had the same densities as the test samples). In Table 1 are also shown the results of assessment of hardness in comparison with the controls, in which the ratings are as follows:
A: At least 10% improvement in compression hardness is attained.
B: No improvement in compression hardness is attained, or an improvement of less than 10%.

(2) Combustibility test

Test sample was burnt to observe the generation of soot. The results are shown in Table 1, in which the ratings are as follows:
A: No soot or black smoke is generated.
B: Soot or black smoke is generated.

(3) Dimensional stability test

The test was carried out in accordance with the method specified in JIS K 6767. Test sample was heated to 110° C. for 22 hours to measure thermal shrinkage. The results are shown in Table 1, in which the ratings are as follows:
A: Shrinkage is less than 5%.
B: Shrinkage is between 5-10%
C: Shrinkage is more than 10%.

In Table 1, abbreviations "PE" and "MMA" are polyethylene and methylmethacrylate, respectively.

TABLE 1

| Shaped body | Amount of PE (parts) | Amount of MMA (parts) | Graft efficiency (%) | Density (g/cm$^3$) | Compression hardness (Kg/cm$^2$ G) | Dimensional stability | Combustibility |
|---|---|---|---|---|---|---|---|
| Example 1 | 85 | 15 | 92 | 0.067 | 3.2 A | A | A |
| Example 2 | 75 | 25 | 93 | 0.022 | 1.2 A | A | A |
| Example 3 | 67 | 33 | 90 | 0.040 | 2.1 A | A | A |
| Example 4 | 55 | 45 | 88 | 0.033 | 1.8 A | A | A |
| Comparative Example 1 | 95 | 5 | 90 | 0.022 | 0.8 B | A | A |
| Comparative Example 2 | 45 | 55 | 79 | 0.033 | 1.2 B | B | A |
| Comparative Example 3 | 100 | 0 | — | 0.033 | 1.2 B | A | A |
| Comparative Example 4 | 55 | Styrene Monomer 45 | 85 | 0.022 | 1.8 A | A | B |

EXAMPLE 5

Using the shaped, foamed bodies obtained in Example 2 and Comparative Examples 3 and 4, consumable patters were prepared. Each pattern was coated with a suitable moldwash and embedded in a mold body formed of furan bonded sand, together with a gating system including a sprue, a runner and an ingate. A molten metal charge was then poured from a runner box provided above the sprue into the gating system to obtain a casting. As the molten metal charge, molten cast iron having a temperature of 1350° C. and containing 3.24% of carbon, 2.7% of silicon, 0.65% of manganese and the balance being essentially iron, or a molten cast steel having a temperature of 1530° C. and containing 0.18% of carbon, 0.40% of silicon, 0.70% of manganese and the balance being essentially iron was used. A MgO moldwash was used in the casting of cast iron, while a zircon moldwash was employed in the casting of cast steel. A blind riser with a diameter of 50 mm and a height of 50 mm was provided in the mold body in the case of the production of cast steel castings. The thus obtained castings were then assessed for their quality by observing the presence of carbon residues, surface and inside defects and deformation. The results are shown in the Table 2. The term "carbon residue" in the quality assessment means the carbon residue deposits on the surface of the casting, "defect" means a surface defect of "gas wrinkle", "wavy roughening" or "gas defect," or inside defect of "carburization", and "deformation" means deformation in shape or dimensions of the casting in comparison with the shape and dimensions of the consumable pattern used.

TABLE 2

| Consumable pattern | Example 2 | Example 2 | Comp. Example 3 | Comp. Example 4 |
|---|---|---|---|---|
| Density (g/cm³) | 0.022 | 0.022 | 0.033 | 0.022 |
| Molten metal | cast iron | cast steel | cast iron | cast iron |
| Carbon residue | nil | nil | nil | exist |
| Defect | nil | nil | exist | exist |
| Deformation | nil | nil | nil | nil |

EXAMPLES 6-10

Example 1 was repeated in the same manner as described, except that a mixture of methylmethacrylate and styrene (ST) with a mixing ratio shown in Table 3 was used in place of methylmethacrylate, and that the amounts of the polyethylene resin pellets and the polymerizable monomer were varied as shown in Table 3. The graft efficiency of the polymerizable monomer, the density, compression set, compression hardness, dimensional stability and combustibility of the shaped, foamed body were as summarized in Table 3. The compression set was tested in the manner specified in JIS 6767. The ratings are as follows.

A: Compression set is not greater than 15%.
B: Compression set is greater than 15%.

COMPARATIVE EXAMPLE 5 and 6

Example 1 was repeated in the same manner as described, except that styrene was used in place of methylmethacrylate, in an amount as shown in Table 3, and the amount of the polyethylene resin pellet was varied as shown in Table 3. The physical properties of the resulting foamed bodies are shown in Table 3.

TABLE 3

| Shaped body | Amount of PE (parts) | Amount of MMA (parts) | Amount of ST (parts) | Graft efficiency (%) | Density (g/cm³) | Compression set | Compression hardness (Kg/cm²G) | Dimensional stability | Combustibility |
|---|---|---|---|---|---|---|---|---|---|
| Example 6 | 72 | 10 | 18 | 90 | 0.033 | A | 1.8 A | A | A |
| Example 7 | 75 | 15 | 10 | 90 | 0.040 | A | 2.1 A | A | A |
| Example 8 | 80 | 10 | 10 | 95 | 0.050 | A | 2.2 A | A | A |
| Example 9 | 80 | 15 | 5 | 94 | 0.067 | A | 3.2 A | A | A |
| Example 10 | 85 | 10 | 5 | 95 | 0.022 | A | 1.2 A | A | A |
| Comparative Example 5 | 65 | 0 | 35 | 85 | 0.033 | B | 1.6 A | B | B |
| Comparative Example 6 | 95 | 0 | 5 | 95 | 0.033 | A | 1.15 B | A | A |

We claim:

1. Expanded particles obtained by a method including the steps of:
   providing unexpanded particles formed of a polyethylene resin having a density of 0.950–0.970 g/cm³;
   impregnating said unexpanded particles with a liquid containing a polymerizable monomer, including an acrylic monomer, of the formula:

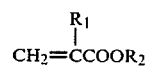

wherein $R_1$ represents hydrogen or methyl and $R_2$ represents hydrogen or an alkyl, said unexpanded particles being impregnated with the polymerizable monomer in an amount of 10–50% based on the total weight of the unexpanded polyethylene particles and the polymerizable monomer;
   subjecting the impregnated polymerizable monomer to polymerization conditions so that at least a portion of said acrylic monomer is grafted onto the polyethylene resin to obtain modified polyethylene particles; and
   subjecting the modified polyethylene particles to an expansion treatment to obtain said expanded particles.

2. Expanded particles according to claim 1 and having a particle size of 0.5–15 mm and an apparent density of 0.01–0.2 g/cm³.

3. Expanded particles according to claim 1, wherein the polyethylene resin is a crosslinked polyethylene resin having a gel fraction of 10–40%.

4. Expanded particles according to claim 1, wherein the polyethylene resin has an MFR value of 8 or less.

5. Expanded particles according to claim 1, wherein the unexpanded particles have an average particle size of 0.3–2 mm.

6. Expanded particles according to claim 1, wherein the polymerizable monomer consists essentially of the acrylic monomer.

7. Expanded particles according to claim 1, wherein said polymerizable monomer further includes a styrenic monomer having the general formula:

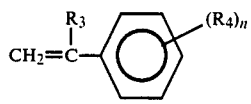

wherein $R_3$ represents hydrogen or an alkyl, $R_4$ represents hydrogen, a halogen or an alkyl and n is an integer of 1–5, at least a portion of said styrenic monomer being grafted on the polyethylene resin.

8. Expanded particles according to claim 7, wherein said unexpanded polyethylene resin particles are impregnated with the polymerizable monomer in an amount of 10–30% based on the total weight of the unexpanded polyethylene resin particles and the polymerizable monomer.

9. Expanded particles formed of a polyethylene resin having grafted thereon a polymerizable monomer, including an acrylic monomer, of the formula:

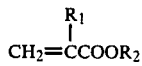

wherein $R_1$ represents hydrogen or methyl and $R_2$ represents hydrogen or an alkyl, the amount of the polymerizable monomer grafted onto the polyethylene resin being in the range of 8–50% based on the total weight of the polyethylene resin and the grafted polymerizable monomer, said polyethylene resin having a density of 0.950–0.970 g/cm$^3$.

10. Expanded particles according to claim 9, wherein the polymerizable monomer consists essentially of the acrylic monomer.

11. Expanded particles according to claim 9, wherein said polymerizable monomer further includes a styrenic monomer having the general formula:

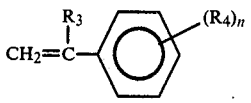

wherein $R_3$ represents hydrogen or an alkyl, $R_4$ represents hydrogen, a halogen or an alkyl and n is an integer of 1–5.

12. Expanded particles according to claim 11, wherein the amount of said styrenic monomer grafted on the polyethylene resin is not greater than 20% based on the total weight of the polyethylene resin and the grafted polymerizable monomer.

13. Expanded particles according to claim 11, wherein the amount of the polymerizable monomer grafted on the polyethylene resin is 8–30% based on the total weight of the polyethylene resin and the grafted polymerizable monomer.

14. Expanded particles according to claim 11, wherein the polyethylene resin is a crosslinked polyethylene resin with a gel fraction of 10–35%.

15. A shaped, foamed article obtained by a method including the steps of filling a mold cavity with the expanded particles according to claim 1 and heating the expanded particles for further expansion thereof within the mold.

16. A shaped, formed article according to claim 15, wherein said polymerizable monomer further includes a styrenic monomer having the general formula:

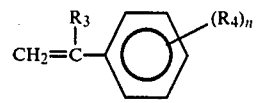

wherein $R_3$ represents hydrogen or an alkyl $R_4$ represents hydrogen, a halogen or an alkyl and n is an integer of 1–5.

17. A shaped, foamed article according to claim 16, wherein the polyethylene resin is a crosslinked polyethylene resin with a gel fraction of 10–35%.

18. A shaped, foamed article according to claim 15, wherein the amount of said styrene-series monomer grafted on the polyethylene resin is not greater than 20% based on the total weight of the polyethylene resin and the grafted polymerizable monomer.

19. A shaped, foamed article obtained by a method including the steps of filling a mold cavity with the expanded particles according to claim 9 and heating the expanded particles for further expansion thereof within the mold.

* * * * *